United States Patent [19] [11] 4,001,506
Brandstatter [45] * Jan. 4, 1977

[54] HOME INTERCOM TELEPHONE SET

[76] Inventor: Horst Brandstatter, Vestner Str. 7, Zirndorf, Germany

[ * ] Notice: The portion of the term of this patent subsequent to Dec. 2, 1992, has been disclaimed.

[22] Filed: Oct. 8, 1975

[21] Appl. No.: 620,595

Related U.S. Application Data

[63] Continuation of Ser. No. 509,540, Sept. 26, 1974, Pat. No. 3,924,073.

[52] U.S. Cl. .......................... 179/1 H; 179/100 R; 179/158 R
[51] Int. Cl.² ..................... H04M 1/02; H04M 1/08
[58] Field of Search ............ 179/1 H, 1 HF, 100 R, 179/100 D, 100 L, 178, 179

[56] References Cited

UNITED STATES PATENTS

| | | | |
|---|---|---|---|
| 2,763,719 | 9/1956 | Schoeneberg | 179/1 H |
| 2,912,502 | 11/1959 | Talcott | 179/1 H |
| 3,126,454 | 3/1964 | Fresk et al. | 179/100 D |
| 3,345,466 | 10/1967 | Rahmig | 179/1 H |
| 3,594,515 | 7/1971 | Brown | 179/100 R |
| 3,657,487 | 4/1972 | Schwanck et al. | 179/100 R |
| 3,924,073 | 12/1975 | Brandstatter | 179/1 H |

Primary Examiner—Kathleen H. Claffy
Assistant Examiner—Randall P. Myers
Attorney, Agent, or Firm—Dorsey, Windhorst, Hannaford, Whitney & Halladay

[57] ABSTRACT

The present invention concerns a toy telephone or home intercom in which the electrical parts and connections are prefabricated into a self-contained unit which can be detachably mounted in a telephone case.

1 Claim, 3 Drawing Figures

HOME INTERCOM TELEPHONE SET

This is a continuation of application Ser. No. 509,540, filed Sept. 26, 1974 now U.S. Pat. No. 3,924,073.

The invention concerns a telephone, particularly a toy or home intercom, with a case designed to hold the receiver and having a reversing switch, actuated by replacing or removing the receiver, for switching from a talking to a ringing unit and with a selector for selecting the ringing unit of at least one other telephone.

In the production of these telephones, the manufacture and assembly of the switching devices, mostly designed as wire straps, and of their connecting lines in the case represent a considerable cost factor. Particularly aggravating is the fact that the selection of the best location for the plants for the manufacture of the case and of the receivers, which are most made of injection molded plastic parts, provides extremely unfavorable conditions regarding the manufacture and assembly of the electrical parts and connecting lines in the case, which require a great amount of manual labor. The labor costs for the assembly of the electrical parts and connecting lines in the case are much higher with optimum selection of the location of the continuous casting plant for the case parts, than in many other sectors, but, on the other hand, the costs of shipping the relatively bulky case parts to locations with lower labor costs for the assembly of the electrical parts in the case are prohibitive.

The invention is based on the problem of providing a telephone, particularly as a toy or home intercom, which can be produced simpler and cheaper and which permits particularly the utilization of the wage cost factor to reduce the assembly costs.

For the solution of this problem in a telephone of the above mentioned type according to the invention, it is provided that all electrical parts and connecting lines arranged in the case are combined to a prefabricated unit which can be inserted, preferably detachably, in the case.

In contrast to the present construction of all such telephones, where a plurality of jumper wires have to be bent, secured in the case bottom, and soldered with each other, the prefabricated unit in the embodiment according to the invention can be produced in so-called low-wage regions or low-wage countries without the shipping costs playing a great part because of the small size of the units, after which this unit merely has to be inserted in the case, which can be done in a very simple manner by using spring locks, etc.

With particular advantage the units can be already rigidly connected with the receiver cord and wired with its lines before it is inserted into the case, so that actually no electrical connections have to be established at all during the final assembly by soldering, etc.

Another simplification in the manufacture and assembly of a telephone according to the invention results from the fact that the ringing unit is arranged in the receiver, preferably combined with its loudspeaker part, since the construction of a ringing unit by arranging a second sound transmitter diaphragm on the side of the loudspeaker coil opposite the loudspeaker diaphragm requires much less work than the manufacture of a separate ringing unit forming a separate part.

The prefabricated unit according to the invention can be provided according to a further embodiment of the invention with a plug accessible from the outside through a recess in the case for plugging in the connecting cord to a second telephone.

Of particular importance in one design of a telephone according to the invention is providing apparatus where the selecting mechanism is a simple ringing key which, with the receiver replaced in the opposite telephone, connects its ringing unit to the current source of the calling telephone. For these telephones, a design is of advantage where the jumper wires in the case are inserted in outside bearing grooves of two parallel web plates of an insulating supporting plate, preferably made of plastic, so that the jumper wires form contact pins arranged opposite each other in pairs in the range of movement of spring elements arranged between the web plates to form electrical connecting stirrups, which can be turned by the switching or ringing key.

Spring elements which can be used with particular advantage are designed as substantially U-shaped spring wire stirrups which can be inserted with their bent-off ends in recesses of the supporting plate, while the jumper wire elements, which are inserted without adhesive or soldering joints, can be held together in the embodiment of the invention by a U-shaped rail of insulating material, particularly plastic, which embraces the web plates clampingly and serves to hold the jumper wires in the bearing grooves of the web plates, and whose base can form at the same time a limiting stop for the movement of at least one of the spring elements.

The plug for plugging-in the connecting cord for the second telephone can be formed in a particularly simple manner by U-shaped bendings of the corresponding jumper wires clamped in slotted sleeve extensions of the bearing plate.

The fastening of the receiver cord can be effected preferably by clamping means attached on the supporting plate.

In a particularly simple and advantageous manner the supporting plate can form the cover of a box, attached on the bottom of the case, which is open at the top for the insertion of batteries, so that at the same time a simple contacting of the batteries is made possible by the springlike bends of the corresponding jumper wires.

Other advantageous features and details of the invention will result from the following description of an embodiment, as well as on the basis of the drawings.

Figure 1:
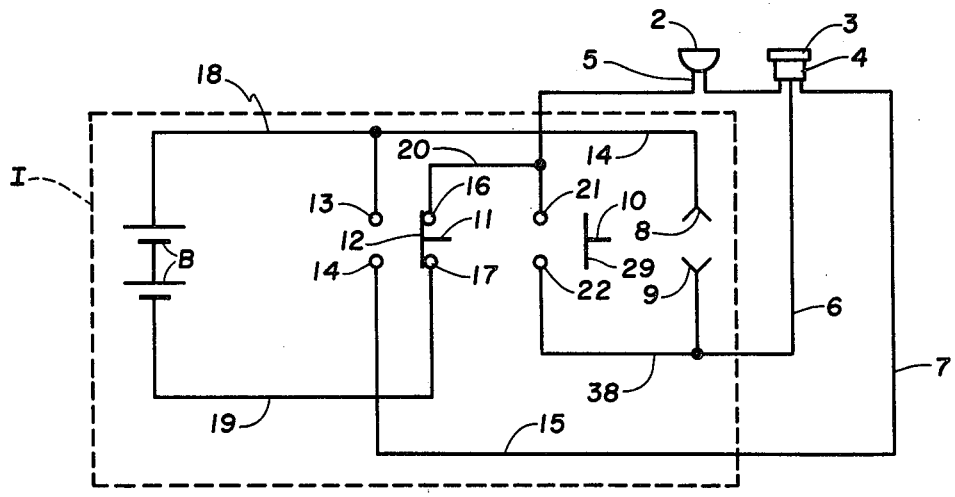
FIG. 1 shows the schematic circuit diagram of a telephone according to the invention.

The box I represented in broken lines in the circuit diagram according to FIG. 1 frames those parts and connecting lines of a telephone, with a ringing key for selecting the telephone to be called, which are arranged in the case, while the microphone 2, the loudspeaker 3 and the ringing units 4 are arranged in the receiver and are connected to the circuit in the case by means of the connecting lines 5, 6 and 7 combined in a receiver cord, 8 and 9 are the terminals where two telephone apparatus forming a set are to be electrically connected with each other, 10 is the ringing key and 11 the reversing key for a switching device switching from talking to the ringing unit 4.

With the receiver replaced, the electrically conductive connecting stirrup 12 of the reversing key 11 bears on the contacts 13 and 14, so that, when a ringing signal arrives from the opposite telephone at the input and output terminals 8 and 9, a connection is established from the terminal 8 over the line 14, the connecting stirrup 12, the lines 15 and 7 and the ringing unit 4 and the line 6 to the terminal 9. The microphone 2 and the loudspeaker 3 remain disconnected.

If the receiver is lifted, due to the ringing signal given off by the ringing unit, the spring-loaded reversing key 11 separates the contacts 13 and 14, and the connecting stirrup 12 now connects the contacts 16 and 17. We have thus an electrical connection from the terminal 8 over the lines 14 and 18, battery B, line 19, connecting stirrup 12, lines 20 and 5, microphone 2, loudspeaker 3 and line 6 to the terminal 9. The ringing unit 4 is disconnected and the arriving speaking signals arrive at the loudspeaker 3 and the speaking signals from the microphone 2 are fed over the terminals 8 and 9 to the opposite telephone.

Calling the opposite telephone is effected with the receiver lifted, that is, the switching portion of the connecting stirrup 12 represented in FIG. 1, by actuating the ringing key 10 so that a voltage signal is applied by the battery B to the terminals 8 and 9 and thus to the ringing unit 4 of the opposite telephone.

Figure 2:
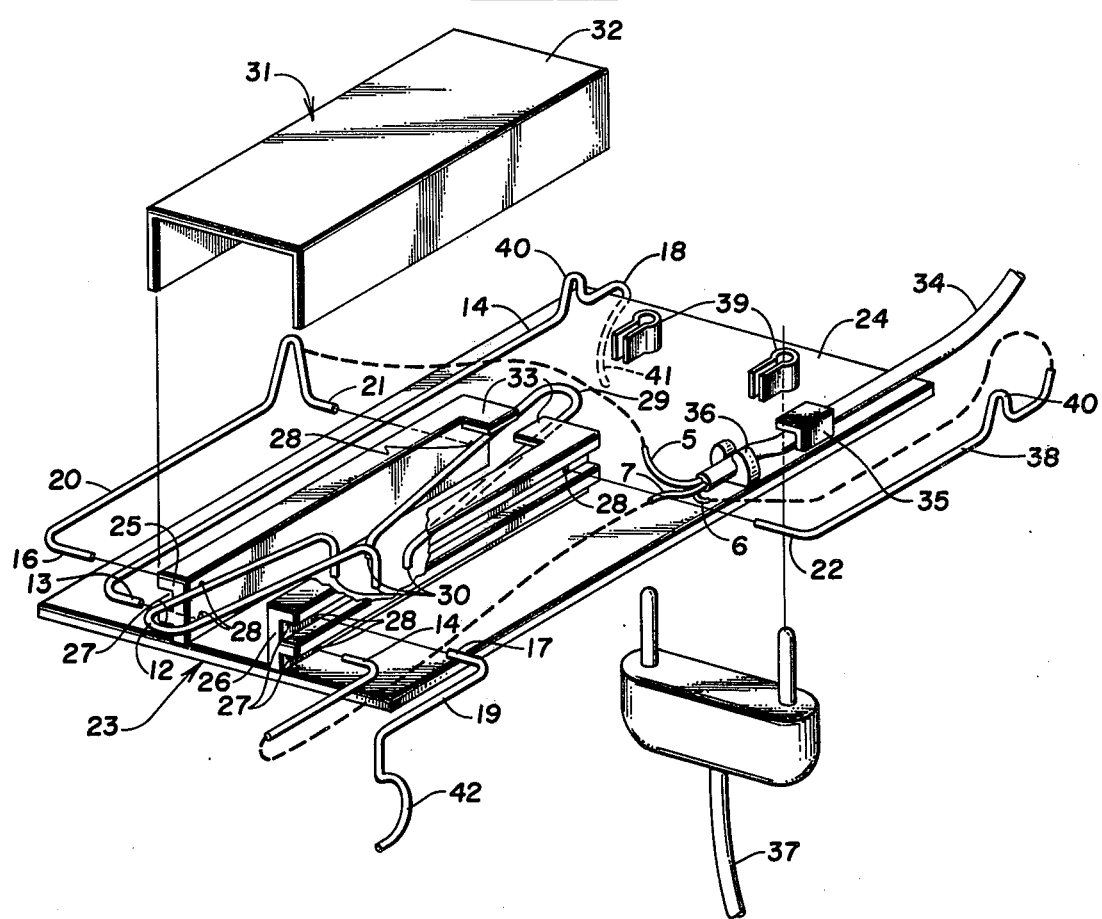
FIG. 2 shows a perspective exploded view of a unit according to the invention containing the electrical parts and connecting lines for the case, which only has to be anchored mechanically in the case.

The circuit in the case, outlined in FIG. 1 by broken lines, is combined in the unit represented in FIG. 2 where, in order to facilitate the understanding of the drawings, the jumper wires used for the construction of the circuit are provided with the same reference numbers as the corresponding connecting lines in the circuit diagram of FIG. 1.

The presented unit 23 comprises a supporting plate 24 with parallel web plates 25 and 26, which have outside bearing grooves 27 for inserting the jumper wires designed as dimensionally stable wire-stirrups. Bent-off ends of jumper wires protruding through bores 28 of the web plates into the space between them form the contacts designated with 13, 14; 16, 17; 21 and 22 in FIG. 1, while the connecting stirrup 12 of the reversing key 11, as well as the connecting stirrup 29 of the ringing key 10 are designed as V-shaped spring wire stirrups whose bent-off ends are inserted into recesses 30 of the supporting plate 24. The spring wire stirrups are designated with the same reference numbers 12 and 29 as the schematically represented connecting stirrups in the circuit diagram in FIG. 1.

A U-shaped rail 30 clampingly embracing the web plates 25, 26 serves to hold the jumper wires in the bearing grooves 27 of the web plates 25, 26, so that additional fastening, for example, by soldering or cementing the jumping wires, is not necessary. The base 32 of the rail 31 can replace the lugs 33 of the two web plates 25, 26 serving as limiting stops for the spring wire stirrup 13 of the ringing unit.

The receiver cord 34 is secured on the supporting plate by clamping means 35 and 36 attached on the supporting plate 24.

For the formation of the plug for plugging-in the connecting cord 37 (FIG. 2) of two telephone apparatuses, the jumper wires 14 and 38 are provided with U-shaped bends 40 clamped in slotted sleeve lugs 39 of the supporting plate 24.

The jumper wire 18 integral with the jumper wire 14 embraces the supporting plate 24 and bears with a bent-off spring end 41 on the negative pole of a battery arranged underneath the supporting plate, while a bent-off arm 42 of the jumper wire 19 bears clampingly on the positive battery contact.

Figure 3:
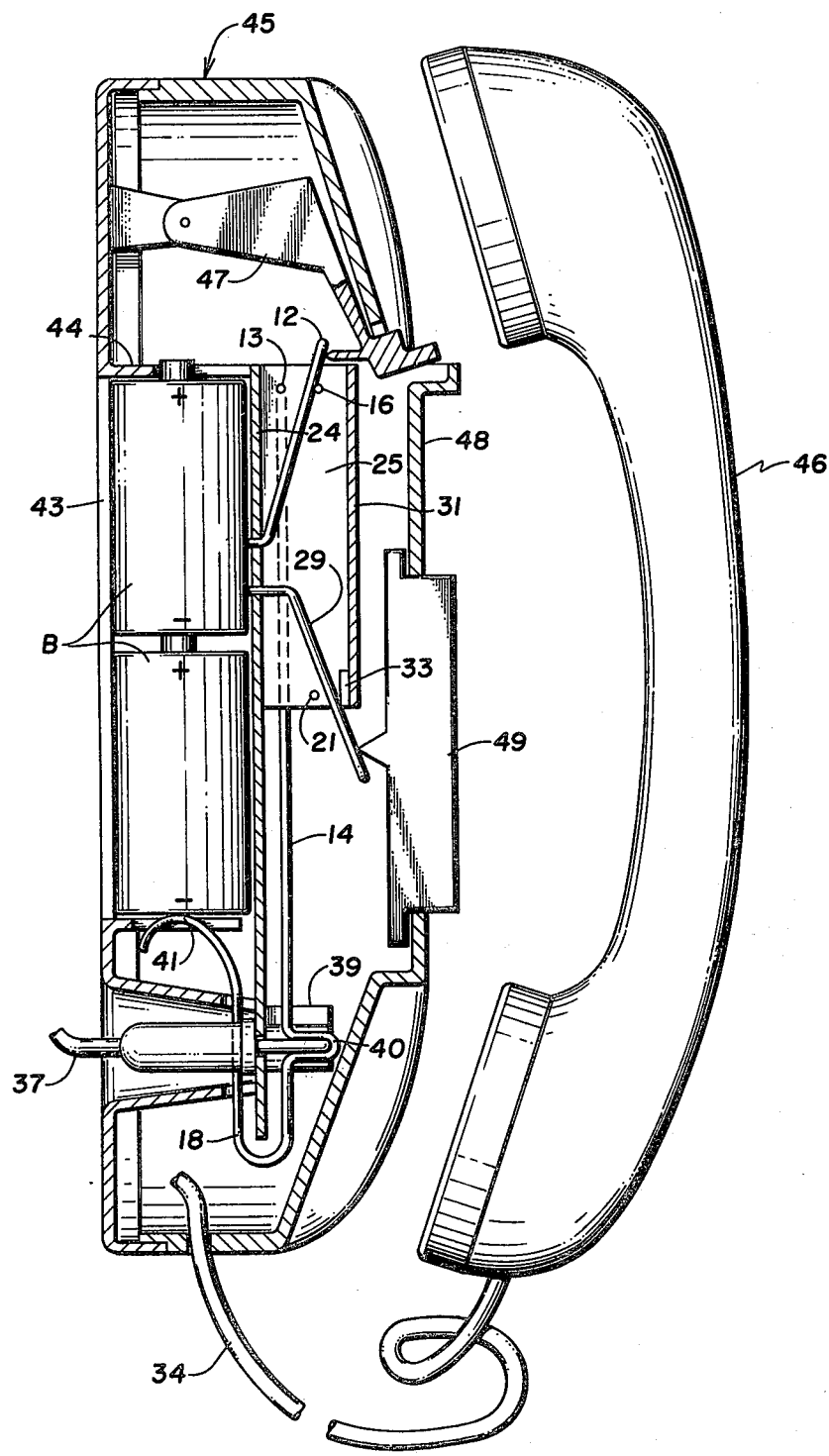
FIG. 3 shows a side elevation of a telephone according to the invention with a unit according to FIG. 2 in the housing cut along its longitudinal center plane.

As can be seen from FIG. 3, the supporting plate 24 forms the cover of a box 44, attached to the bottom of the case 43 and open at the top for the insertion of the batteries B, the fastening of the supporting plate on this box being effected by attached spring arms (not shown) with claws embracing the supporting plate.

With the receiver 46 replaced on the case 45, the reversing key 47 which could also be articulated to the supporting plate 24, contrary to the represented arrangement, is turned to the inside and thus presses the spring wire stirrup 12 contactingly to the contacts 13 and 14. In the cover 48 of the case 45 is arranged a ringing key 49 to turn the spring wire stirrup 29 electrically contacting toward the contact pins 21 and 22 and to actuate the ringing unit of the opposite telephone.

I claim:
1. A telephone for use in an intercom system having a similar second telephone, the telephone comprising:
a prefabricated unit comprising a supporting plate having attached thereto electrical connecting lines including dimensionally stable wire stirrups forming a first, second and third pair of contact pins;
a case enclosing said electrical connecting lines and detachably secured to said supporting plate;
a ringing unit electrically connected to said electrical connecting lines;
a receiver having assembled therein a speaking unit comprising a microphone and a loudspeaker electrically connected to said electrical connecting lines,
wherein said receiver is removably held by said case;
means for connecting a current source to said electrical connecting lines;
means for electrically connecting the second telephone to said electrical connecting lines;
an electrically conductive selector device selectively movable into and out of contact with said first pair of contact pins to establish or break electrical connection therebetween, wherein said selector device comprises a first spring element normally biased out of contact with said first pair of contact pins;
a ringing key for energizing the ringing unit of the second telephone when said ringing key is actuated, wherein said ringing key cooperates with said selector device to move said selector device against its normal spring bias and into contact with said first pair of contact pins when said ringing key is actuated;
an electrically conductive switching device selectively movable into contact with said second and third pairs of contact pins to selectively establish electrical connection between contact pins of each said pair, wherein said switching device comprises a second spring element normally biased into contact with said third pair of contact pins; and
a reversing key having a first position for connecting said ringing unit into an electrical circuit including the selector device of the second telephone and a second position for connecting said speaking unit into an electrical circuit including the speaking unit of the second telephone when its reversing key is in the second position and for connecting said selec- tor device into an electrical circuit including the ringing unit of the second telephone when its reversing key is in its first position, wherein said switching device and said receiver cooperate with said reversing key to move said reversing key into its first position when said receiver is held by said case and establish electrical connection between said second pair of contact pins by moving said switching device against its normal bias and to move said reversing key into its second position when said receiver is removed from said case and establish electrical connection between said third pair of contact pins by permitting said switching device to move according to its normal bias.

* * * * *